US011284750B2

(12) United States Patent
Rodriguez et al.

(10) Patent No.: US 11,284,750 B2
(45) Date of Patent: Mar. 29, 2022

(54) MANUFACTURING METHOD FOR OBTAINING A DECORATIVE PANEL FOR SHOWER TRAYS

(71) Applicant: WORLD ELASTOMERS TRADE, SL, Canyelles (ES)

(72) Inventors: François Rodriguez, Vilanova i la Geltru (ES); Xavier Blanch Andreu, Sant Pere de Ribes (ES)

(73) Assignee: WORLD ELASTOMERS TRADE, SL, Barcelona (ES)

( * ) Notice: Subject to any disclaimer, the term of this patent is extended or adjusted under 35 U.S.C. 154(b) by 0 days.

(21) Appl. No.: 15/930,897

(22) Filed: May 13, 2020

(65) Prior Publication Data

US 2020/0268216 A1 Aug. 27, 2020

Related U.S. Application Data

(63) Continuation of application No. 16/184,011, filed on Nov. 8, 2018, now abandoned.

(30) Foreign Application Priority Data

Nov. 15, 2017 (ES) ............................... ES201731393

(51) Int. Cl.
*A47K 3/40* (2006.01)
*B44C 5/04* (2006.01)

(52) U.S. Cl.
CPC . *A47K 3/40* (2013.01); *B44C 5/04* (2013.01)

(58) Field of Classification Search
CPC ....................................................... A47K 3/40
USPC ........................................................ 4/612–614
See application file for complete search history.

(56) References Cited

U.S. PATENT DOCUMENTS

| | | | | | |
|---|---|---|---|---|---|
| 4,219,598 | A | * | 8/1980 | Noma et al. | B32B 27/12 |
| 5,308,426 | A | * | 5/1994 | Claveau | B32B 9/00 |
| 5,336,354 | A | * | 8/1994 | Looi et al. | B32B 31/00 |
| 5,545,446 | A | * | 8/1996 | Looi et al. | B32B 31/00 |
| 5,893,964 | A | * | 4/1999 | Claveau | B32B 31/00 |
| 8,551,280 | B2 | * | 10/2013 | Villarreal | C09J 5/02 |
| 2008/0222793 | A1 | * | 9/2008 | Cook | A47K 3/00 |
| 2015/0158329 | A1 | | 6/2015 | Grunwald et al. | |
| 2018/0170083 | A1 | * | 6/2018 | De Mondt | B32B 27/304 |
| 2019/0142225 | A1 | * | 5/2019 | Rodriguez | A47K 3/40 |

* cited by examiner

*Primary Examiner* — Lori L Baker
(74) *Attorney, Agent, or Firm* — Robert J. Hess; Hess Patent Law Firm

(57) ABSTRACT

Coating outer surfaces of a polymeric panel with a decorative pattern printed on the outer surfaces using an ink which is transferred to the panel by sublimation in a vacuum chamber under predetermined temperature, pressure, and time conditions. The panel has a perimetral area having a greater thickness and at least one non-perimetral area having a smaller thickness. All the surfaces of the panel coated with the decorative pattern have a uniform finish. A protective layer is placed on a non-perimetric zone of the panel to prevent overheating during the panel curing process and to avoid imperfections on the decorative pattern from being formed on the non-perimetric zone.

10 Claims, 3 Drawing Sheets

MANUFACTURING METHOD FOR OBTAINING A DECORATIVE PANEL FOR SHOWER TRAYS

This non-provisional application is a continuation application of U.S Ser No. 16/184,011 filed on Nov. 8, 2018, which claims priority to and the benefit of Spanish Application No. 201731393, filed Nov. 15, 2017, the contents of which are incorporated herein by reference in their entireties.

FIELD OF THE INVENTION

The present invention relates to a manufacturing method for obtaining a panel, such as a polymeric panel, or a panel made of a solid surface material i.e. a synthetic material generally composed of a combination of alumina trihydrate (ATH), resins and acrylic pigments, epoxy or polyester that is to say a composite solid material.

The panel is specifically a decorative panel making up a shower tray, the outer surface of which is coated with a decorative pattern by sublimation.

BACKGROUND OF THE INVENTION

A manufacturing process whereby parts, panels, in which the different panel surfaces are decorated with a decorative pattern by sublimation are obtained, is known in the state of the art according to patent no. U.S. Pat. No. 5,308,426 A. Said process for obtaining a decorated panel comprises the following steps:
  placing an extensible substrate bearing said decorative pattern made with a sublimable ink on the panel to be decorated, enveloping all the surfaces thereof;
  subsequently inserting the substrate-enveloped panel in a vacuum chamber so that the substrate adapts optimally to the shape of the panel; and
  performing controlled heating of the panel-substrate assembly inside said vacuum chamber, facilitating the transfer of the decorative pattern to multiple surfaces of the panel by sublimation.

The substrate on which the decorative pattern is inserted or printed can be made of a woven textile material or a non-textile material.

However, the panels obtained by the mentioned method generally have a uniform thickness throughout their entire section and have the decorative pattern applied to all the panel surfaces.

On the other hand, patent no. US 2015/158329 A1 describes a modular panel for a shower screen, wherein said screen comprises:
  a plurality of modular panels coupled to one another forming an enclosure,
  wherein at least one panel of the plurality of modular panels is made of a thermosetting material, such as polyester, having a uniform thickness and a panel surface has an image transferred by means of a sublimable ink.

The panel is formed by means of compression molding by placing the panel between an upper plate at a first temperature and a lower plate at a second temperature that is lower than the first temperature to facilitate the panel curing process and obtain a desired decorated surface. The panel claimed in this patent is simply a panel which makes up at least one of the walls forming a shower screen, wherein said wall is decorated and has a uniform thickness throughout its entire section.

The mentioned methods or the panels obtained from these methods were therefore not meant for coating panels with different thicknesses, and particularly a panel intended for making up a shower tray in which, due to the fact that water must be drained from the floor, one or more slopes and differences in thickness must be included in said floor.

The present invention proposes solving the limitations mentioned in the state of the art and the aforementioned documents by an alternative method.

BRIEF DESCRIPTION OF THE INVENTION

The purpose of the present invention is to provide a polymeric, homogeneous, and rigid panel, for use in home decoration. Specifically, the obtained panel will be a decorative panel making up a shower tray.

Said panel will be made of a thermosetting or solid-surface material, wherein outer surfaces of the panel are coated with a decorative pattern.

The decorative pattern used is printed on said outer surfaces of the panel with an ink that can be transferred to said panel by means of a sublimation process in a vacuum chamber under pre-established temperature, pressure, and time conditions.

The decorative pattern is first printed or illustrated on a transfer substrate, wherein said transfer substrate must be made of a natural or synthetic material that is strong and elastic enough that it allows enveloping the outer surfaces of the panel so that they can be coated in a uniform manner and without distorting or causing imperfections on the printed decorative pattern when it is to be transferred to the outer surfaces of the panel. In other words, all the surfaces of the panel coated with the decorative pattern have a uniform finish. It is also possible that only the surfaces and contours which remain exposed once the panel is placed are coated with the decorative pattern.

The decorative panel making up the shower tray has a perimetral area having a greater thickness and at least one non-perimetral area having a smaller thickness, wherein a shower tray drain is located in the non-perimetral area having a smaller thickness. The perimetral area has a thickness comprised between 2.5 and 3.5 cm and the non-perimetral area has a thickness comprised between 1 and 1.5 cm.

Furthermore, the decorative panel has a quadrangular layout and has, along a cross-section plane, perpendicular to two opposite sides, a variation in thickness, from said perimetral area to said non-perimetral area having a smaller thickness. The quadrangular panel has dimensions comprised by a length between 120 and 180 cm and a width between 70 and 90 cm and said two opposite sides are the distal end sides of the panel having a smaller length corresponding with the width of the panel.

The panel has a first change in thickness with a progressive reduction from the perimetral area to the non-perimetral area, and a second change in thickness with a progressive increase from the non-perimetral area to the perimetral area.

The progressive change in thickness, either with a reduction or an increase, allows the formation of at least one slope between the perimetral area and the non-perimetral area where the drain is located, and this allows draining and directing water that has accumulated in said perimetral area in an optimal manner through the drain.

However, the panels and drain are not limited to said dimensions or mentioned geometries and may vary according to the known state of the art.

The manufacturing process for obtaining the decorative panel making up the shower tray comprises the following steps:
1. printing or illustrating a decorative pattern on a transfer substrate using an ink which can be transferred by sublimation to a polymeric panel;
2. coating said panel with said transfer substrate, coating all the outer surfaces of the panel in a uniform manner;
3. placing a protective layer on a non-perimetral area having a smaller thickness to prevent overheating during the panel curing process and to prevent imperfections on the decorative pattern from being formed on the non-perimetral area having a smaller thickness of the panel, wherein: said protective layer is made of a textile material; and the layer comprises dimensions of 30 cm wide, 40 cm long, and 0.8 cm thick;
4. introducing the panel coated with the transfer substrate with the decorative pattern inside a vacuum chamber to transfer the decorative pattern to the outer surfaces of the panel by means of a sublimation process;
5. applying heat to the panel until reaching a temperature above 160° C. but below 180° C. to obtain homogenous decorative pattern transfer; and
6. performing the sublimation process under pre-established temperature, pressure, and time conditions wherein a press is used, and the press must be at a temperature of about 220° C.

At the end of the sublimation process, a processed end product which is removed from the vacuum chamber is obtained, and the result consists of a panel wherein all the surfaces thereof have been coated with the decorative pattern.

The duration of the process comprises a predefined time for obtaining the panel of between 15 and 25 minutes according to the dimensions of the panel and/or the complexity of the decorative pattern.

Furthermore, the process can be adapted such that the panel is coated in two or more distinctive areas by two or more different decorative patterns.

It will also be understood that the end values of any range of values that is offered may not be optimal and may require adaptations of the invention so that said end values are applicable, said adaptations being within reach of one skilled in the art.

Other features of the invention can be found in the following detailed description of an embodiment.

BRIEF DESCRIPTION OF THE DRAWINGS

The foregoing and other advantages and features will be better understood based on the following detailed description of an embodiment in reference to the attached drawings, which must be interpreted in a non-limiting illustrative manner, in which.

Detailed Description of Embodiments

The attached drawings show illustrative, non-limiting embodiments of the present invention.

Figure 1:
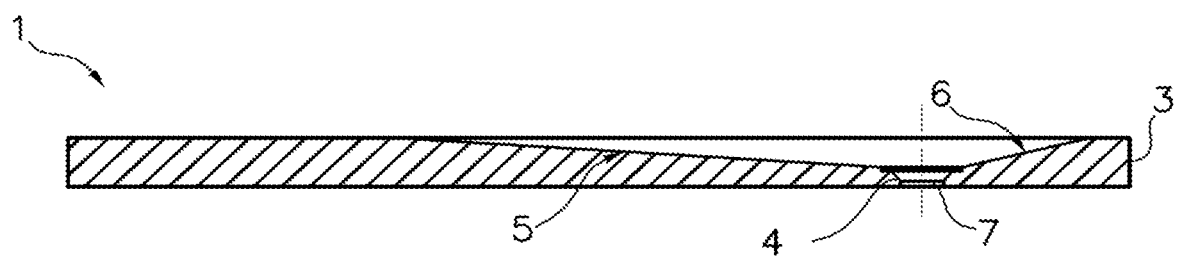
FIG. 1 illustrates a section view of an embodiment of the panel which allows viewing the difference in thickness between the perimetral area and the non-perimetral area of the decorative shower tray and the position of the drain.

FIG. 1 is a front section view of an embodiment, in which the panel 1 is a decorative shower tray. This section view allows for better viewing of the difference in thickness between areas making up the panel 1, said areas being:
   a perimetral area 3 having a greater thickness; and
   a non-perimetral area 4 having a smaller thickness where a drain 7 is located.

There are two progressive changes in thickness, wherein a first change in thickness 5 with a progressive reduction is from the perimetral area 3 to the non-perimetral area 4, and a second change in thickness 6 with a progressive increase is from the non-perimetral area 4 to the perimetral area 3. The progressive changes in thickness 5 and 6 may or may not be symmetrical depending on the thickness of the different areas 3 and 4 of the panel 1 and where each change in thickness 5 and 6 starts.

The perimetral area 3 comprises a thickness between 2.5 and 3.5 cm, and the non-perimetral area 4 comprises a thickness between 1 and 1.5 cm.

Figure 2:
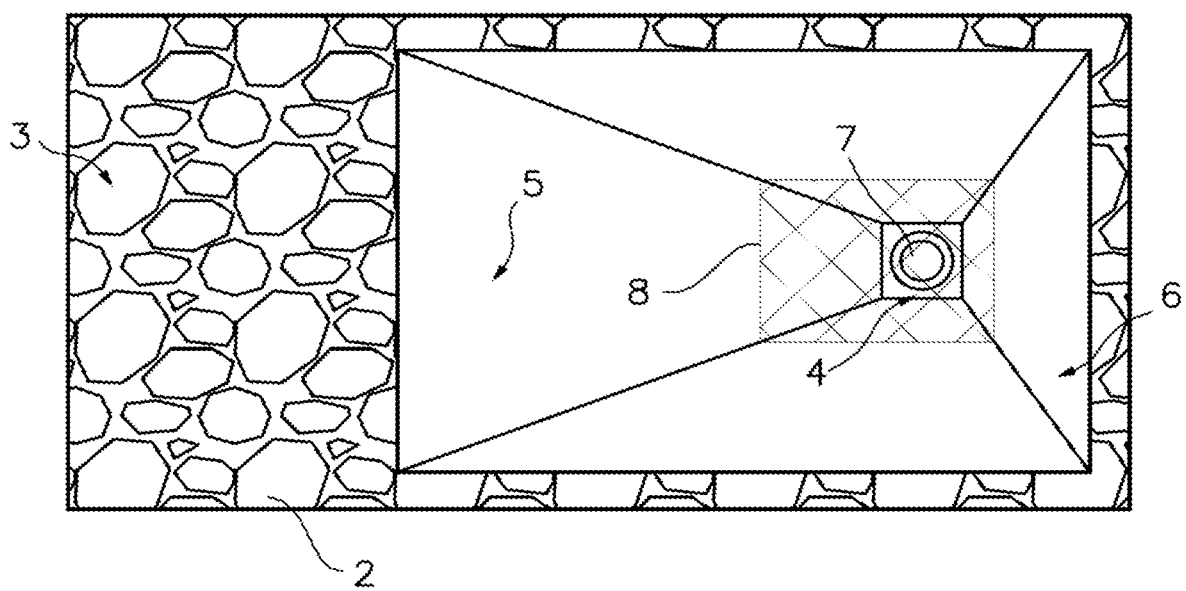
FIG. 2 illustrates a top view of an embodiment of the panel which is a decorative shower tray, wherein the position of the drain in the non-perimetral area and the progressive changes in thickness can be seen.

FIG. 2 illustrates a top view of the same embodiment of the decorative panel 1 as in FIG. 1. In this example, the decorative panel 1 making up the shower tray is decorated by means of a decorative pattern 2 which has been transferred to the panel 1 by means of a sublimation process. The panel has a range of possible dimensions, where the possible length is between 120 cm and 180 cm and the possible width is between 70 cm and 90 cm.

Furthermore, this view allows for better viewing of both progressive changes in thickness 5 and 6 to the non-perimetral area 4 having a smaller thickness where the drain 7 of this embodiment is located.

During the sublimation process, the non-perimetral area 4 and part of the changes in thickness 5 and 6 are protected by a protective layer 8 made of a textile material. Said protective layer 8 is used to protect areas having a smaller thickness from high temperatures during the curing process to prevent imperfections on the decorative pattern 2 from being formed due to the smaller thickness being susceptible to possible deformations. It has the following dimensions: a length of 40 cm, a width of 30 cm, and a thickness of 0.8 cm.

Figure 3:
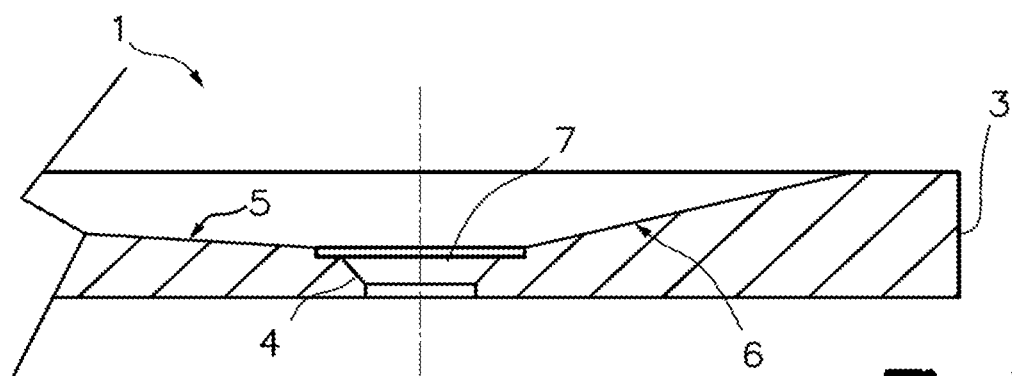
FIG. 3 illustrates an enlarged, detailed view of the area where the drain is located in the section view of FIG. 1.

FIG. 3 is a detailed view of the section view of FIG. 1 to better view the differences in thickness 5 and 6 between the perimetral area 3 and the non-perimetral area 4 where the drain 7 of the panel 1 is located, and at the same time allows better viewing of the configuration of the drain 7.

In the embodiment described in FIGS. 1 to 3, the drain 7 has a specific geometry and position. However, the drain 7 of the panel 1 can be located at any point of the panel 1 given that this position is non-limiting and only constitutes a possible location of the drain 7, provided that it is arranged within the dimensions of panel 1.

Furthermore, the geometry of the drain 7 can be selected from a wide variety of geometries known in the state of the art such as, for example, a circle, a quadrangle, an ellipse, or a triangle. Finally, FIG. 4 illustrates a top view of an alternative embodiment with respect to the embodiment which can be seen in FIG. 2, in which a variation in the geometry of the non-perimetral area 4 can be seen, said geometry being a rectangular geometry where the drain 7 of the shower tray is located.

This variation in the geometry of the non-perimetral area 4, having a smaller thickness, entails a variation in the first change in thickness 5 with a progressive reduction from the perimetral area 3, having a greater thickness, to the non-perimetral area 4, and a variation in the second change in thickness 6 with a progressive increase from the non-perimetral area 4 to the perimetral area 3.

Figure 4:
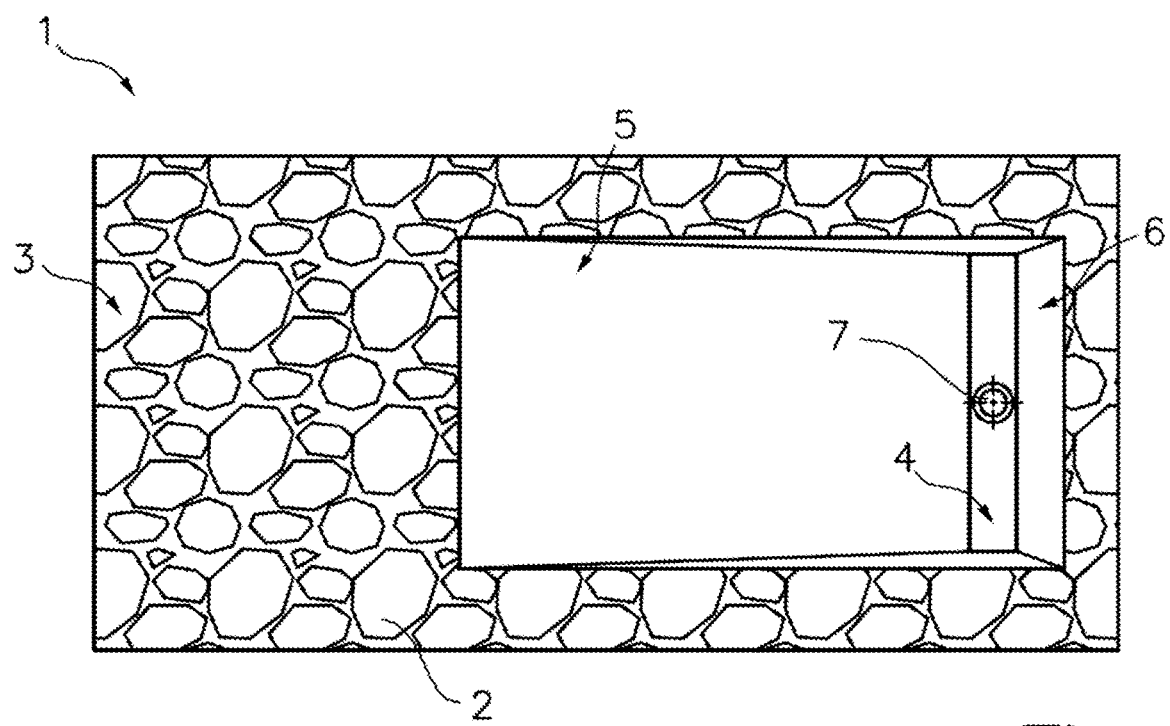
FIG. 4 illustrates a top view of an alternative embodiment of the decorative shower tray of FIG. 2.

A decorative pattern has been randomly selected to illustrate how the decorative pattern 2 is arranged on the different surfaces of the panel 1 making up the shower tray used in both FIG. 2 and FIG. 4.

Figure 5:
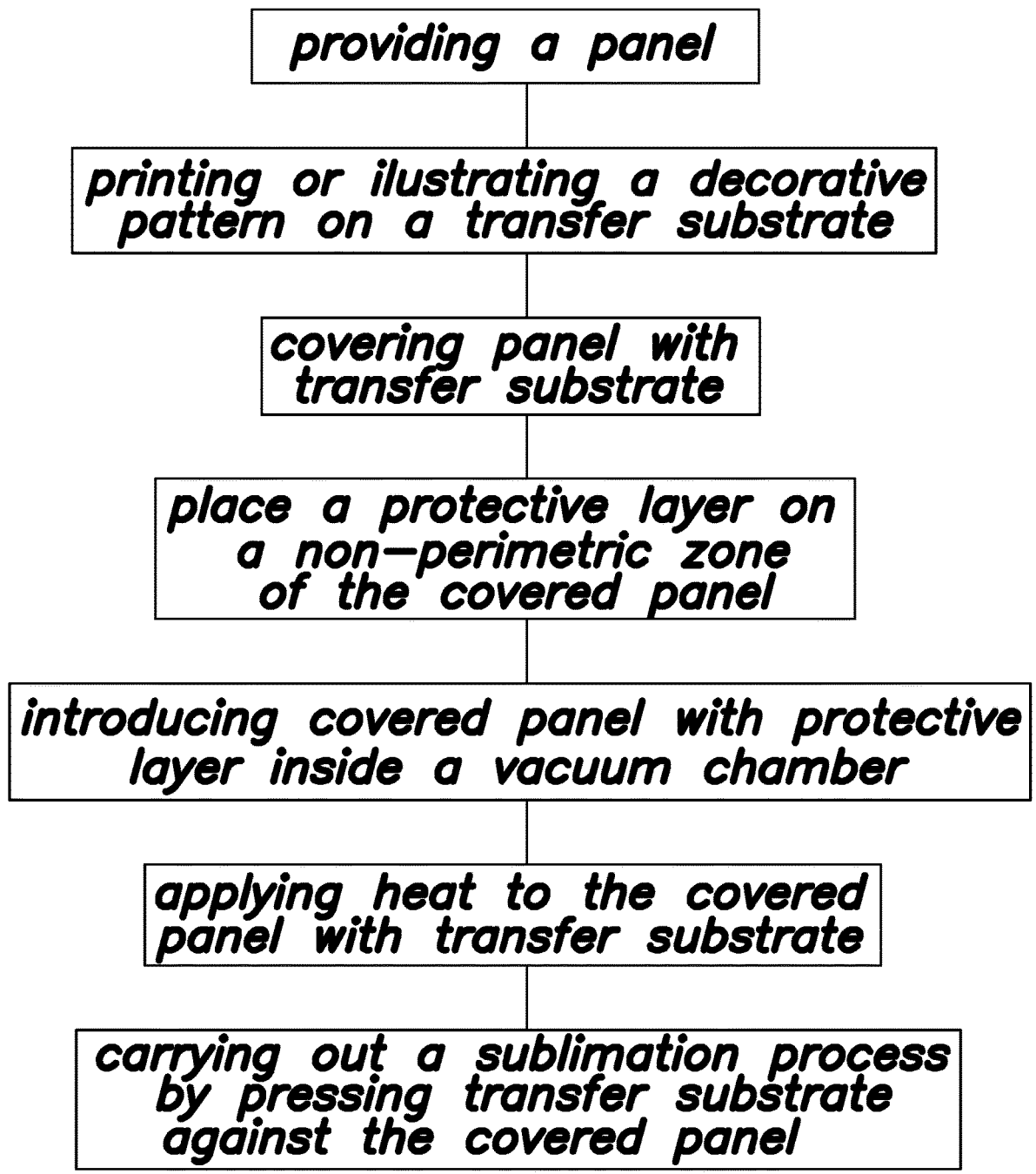
FIG. 5 is a diagram that illustrates the steps for carrying out the manufacturing process.

FIG. 5 sets forth steps for carrying out the manufacturing process, namely, providing a panel, printing or illustrating a decorative pattern on a transfer substrate, covering the panel with the transfer substrate, placing a protective layer on a non-perimetric zone of the covered panel, introducing the covered panel with a protective layer inside a vacuum chamber, applying heat to the covered panel with the transfer substrate and carrying out a sublimation process by pressing the transfer substrate against the covered panel.

It will be understood that the different parts making up the invention described in one embodiment can be freely combined with the parts described in other different embodiments even though said combination has not been explicitly described, provided that the combination is not detrimental.

The invention claimed is:

1. A manufacturing method for obtaining a decorative panel constituting a shower tray, comprising the steps of:
 (a) providing a panel having a perimetric zone of a first thickness and at least one non-perimetric zone of a second thickness, wherein the second thickness being less than the first thickness;
 (b) printing or illustrating a decorative pattern on a transfer substrate with an ink of being transferred by sublimation to said panel;
 (c) covering said panel with said transfer substrate, covering all outer surfaces of the panel in a uniform manner;
 (d) introducing the panel covered with the transfer substrate printed with the decorative pattern inside a vacuum chamber in order to transfer the decorative pattern to the outer surfaces of the panel through a sublimation process;
 (e) applying heat to the panel to obtain a transfer of the decorative pattern; and
 (f) carrying out a sublimation process under predetermined conditions of temperature, pressure, and time by pressing the transfer substrate against the panel, wherein the method further comprises:
 prior to the step (d), placing a protective layer on the non-perimetric zone of the covered panel to prevent overheating during the panel heating process and to avoid imperfections on the decorative pattern from being formed on the non-perimetric zone whereby the finishing of all the surfaces of the panel covered by the decorative pattern is uniform, and
 pressing with a press the substrate against the panel in the step (f) of carrying out the sublimation process, wherein
 the protective layer is made of a textile material.

2. The method according to claim 1, wherein the panel comprises a polymeric panel.

3. The method according to claim 1, wherein the panel comprises a solid surface panel.

4. The method according to claim 1, wherein the protective layer has dimensions of 30 cm wide, 40 cm long and 0.8 cm thick.

5. The method according to claim 2, wherein, in the step of applying heat to the polymer panel, heat is applied to reach a temperature above 160° C. but below 180° C.

6. The method according to claim 3, wherein, in the step of applying heat to the solid surface panel, heat is applied to reach a temperature above 160° C. but below 180° C.

7. Wherein the panel has a quadrangular layout and along a transverse sectional plane, perpendicular to the two opposite sides, has a variation in thickness, from said perimeter zone to said non-perimetrical zone of lesser thickness.

8. The method according to claim 1, wherein the duration of the sublimation process comprises a predefined time for obtaining the panel of between 15 and 25 minutes.

9. The method according to claim 1, wherein the duration of the sublimation process comprises a predefined time for obtaining the panel of between 15 and 25 minutes.

10. A manufacturing method for obtaining a decorative panel constituting a shower tray, comprising the following steps:
 (a) providing a panel having a perimetric zone of a first thickness and at least one non-perimetric zone of a second thickness, wherein the second thickness being less than the first thickness;
 (b) printing or illustrating a decorative pattern on a transfer substrate with an ink capable of being transferred by sublimation to said panel;
 (c) covering said panel with said transfer substrate, covering all outer surfaces of the panel in a uniform manner;
 (d) introducing the panel covered with the transfer substrate printed with the decorative pattern inside a vacuum chamber in order to transfer the decorative pattern to the outer surfaces of the panel through a sublimation process;
 (e) applying heat to the panel to obtain a transfer of the decorative pattern; and
 (f) carrying out a sublimation process under predetermined conditions of temperature, pressure, and time by pressing the transfer substrate against the panel,
 wherein the method further comprises:
 prior to the step (d), placing a protective layer on the non-perimetric zone of the covered panel to prevent overheating during the panel curing heating process and to avoid imperfections on the decorative pattern from being formed on the non-perimetric zone whereby the finishing of all the surfaces of the panel covered by the decorative pattern is uniform, and
 pressing with a press the substrate against the panel in the step (f) of carrying out the sublimation process, wherein the protective layer is made of a textile material, and the duration of the sublimation process comprises a predefined time of between 15 and 25 minutes.

* * * * *